(12) United States Patent
Jiang (10) Patent No.: US 9,727,960 B2
(45) Date of Patent: Aug. 8, 2017

(54) IMAGE PROCESSING METHOD AND APPARATUS

(71) Applicant: TENCENT TECHNOLOGY (SHENZHEN) COMPANY LIMITED, Shenzhen, Guangdong (CN)

(72) Inventor: Deqiang Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/103,621

(22) PCT Filed: Aug. 18, 2014

(86) PCT No.: PCT/CN2014/084598
§ 371 (c)(1),
(2) Date: Jun. 10, 2016

(87) PCT Pub. No.: WO2015/085790
PCT Pub. Date: Jun. 18, 2015

(65) Prior Publication Data
US 2016/0314566 A1    Oct. 27, 2016

(30) Foreign Application Priority Data

Dec. 13, 2013    (CN) .......................... 2013 1 0690424

(51) Int. Cl.
*G06T 5/20* (2006.01)
*G06T 5/00* (2006.01)
*G06T 5/40* (2006.01)

(52) U.S. Cl.
CPC ................ *G06T 5/20* (2013.01); *G06T 5/008* (2013.01); *G06T 5/40* (2013.01); *G06T 2207/10024* (2013.01)

(58) Field of Classification Search
CPC .. H04N 1/40012; H04N 1/40018; H04N 1/54; H04N 1/60; H04N 1/6002;
(Continued)

(56) References Cited

U.S. PATENT DOCUMENTS

2005/0074179 A1* 4/2005 Wilensky ................ G06T 5/007
382/254
2007/0104388 A1* 5/2007 Ali .......................... G06T 5/007
382/274
(Continued)

FOREIGN PATENT DOCUMENTS

CN    101252658 A    8/2008
CN    101556691 A    10/2009
(Continued)

OTHER PUBLICATIONS

Yu, Zeyun, and Chandrajit Bajaj. "A fast and adaptive method for image contrast enhancement." Image Processing, 2004. ICIP'04. 2004 International Conference on. vol. 2. IEEE, 2004.*
(Continued)

*Primary Examiner* — Bhavesh Mehta
*Assistant Examiner* — Narek Zohrabyan
(74) *Attorney, Agent, or Firm* — Knobbe Martens Olson & Bear LLP (57) ABSTRACT

The provided is an image processing method, which includes: converting a to-be-processed image into a gray image; performing Gaussian blur processing having a predefined fuzzy radius on the gray image, and obtaining a reference image; and according to gray values of reference pixels of the reference image, decreasing a pixel value of a pixel of the to-be-processed image corresponding to a reference pixel whose gray value is larger than a gray threshold, increasing a pixel value of a pixel of the to-be-processed image corresponding to a reference pixel whose gray value
(Continued)

is smaller than the gray threshold, and obtaining an adjusted image.

8 Claims, 5 Drawing Sheets

(58) Field of Classification Search
CPC .. H04N 1/6008; H04N 1/6025; H04N 1/6019; H04N 1/6058; H04N 1/6027; H04N 1/6041; H04N 1/6069; H04N 1/6077; H04N 1/6086; H04N 1/6088; H04N 1/62; G06T 7/11; G06T 7/90; G06T 7/44; G06T 7/136
USPC ....... 382/163, 264, 268, 272, 260, 262, 274, 382/169, 273, 162
See application file for complete search history.

(56) References Cited

U.S. PATENT DOCUMENTS

| | | | |
|---|---|---|---|
| 2007/0268534 A1* | 11/2007 | Duan | G06T 5/007 358/520 |
| 2007/0279500 A1* | 12/2007 | Castorina | G06T 5/008 348/254 |
| 2008/0056605 A1* | 3/2008 | Shehata | G06K 9/38 382/274 |
| 2008/0252791 A1 | 10/2008 | Mitsunaga | |
| 2010/0278423 A1* | 11/2010 | Itoh | G06T 5/008 382/169 |
| 2011/0115815 A1* | 5/2011 | Xu | G06T 5/003 345/626 |

FOREIGN PATENT DOCUMENTS

| | | |
|---|---|---|
| CN | 101853490 A | 10/2010 |
| CN | 103002291 A | 3/2013 |

OTHER PUBLICATIONS

International Search Report for International Application No. PCT/CN2014/084598, dated Nov. 19, 2014, 2 pages.

Written Opinion of the International Searching Authority for International Application No. PCT/CN2014/084598, mailed Nov. 19, 2014, 3 pages.

Office Action Issued in Chinese Application No. 201310690424.0 dated Apr. 17, 2017, 7 pages.

Li xueming, Digital Media Technology Basis with English Translation, p. 168, Dec. 31, 2008, 4 pages.

* cited by examiner

Fig. 9

IMAGE PROCESSING METHOD AND APPARATUS

This application claims the benefit of priority from Chinese Patent Application, No. 201310690424.0, entitled "Image Processing Method and System" and filed on Dec. 13, 2013, the entire content of which is hereby incorporated by reference.

TECHNICAL FIELD

The present disclosure relates to image processing technologies, and more particularly to an image processing method and apparatus.

BACKGROUND

Image contrast refers to measurement of different luminance levels between the brightest color "white" and the darkest color "black" in an image. The larger the difference between the brightest color "white" and the darkest color "black" is, the larger the image contrast is. The smaller the difference between the brightest color "white" and the darkest color "black" is, the smaller the image contrast is. The adjustment of image contrast adjustment may improve the display effect of an image. A conventional method for adjusting the image contrast is implemented as follows. An image is converted into a HSV (Hue, Saturation, Value) color space or a LAB (L represents luminance, A represents a range from carmine to green, and B represents a range from yellow to blue) color space. And then, a luminance curve of luminance component (V or L) is adjusted to change a luminance relationship between a pixel before adjustment and the pixel after adjustment, thereby adjusting the image contrast.

However, the adjusted image that is obtained by the conventional method for adjusting the image contrast cannot fully represent details of the image, and may destroy the distribution of bright and dark regions of the image. Accordingly, an ideal image adjustment effect cannot be obtained by the conventional method for adjusting the image contrast.

SUMMARY

Embodiments of the present disclosure provide an image processing method and apparatus, thereby solving a problem that the conventional method for adjusting the image contrast may destroy the distribution of bright and dark regions of an image.

The image processing method includes:
converting a to-be-processed image into a gray image;
performing Gaussian blur processing having a predefined blur radius on the gray image, and obtaining a reference image; and
according to gray values of reference pixels of the reference image, decreasing a pixel value of a pixel of the to-be-processed image corresponding to a reference pixel whose gray value is larger than a gray threshold, increasing a pixel value of a pixel of the to-be-processed image corresponding to a reference pixel whose gray value is smaller than the gray threshold, and obtaining an adjusted image.

The image processing apparatus includes:
a converting module, configured to convert a to-be-processed image into a gray image;
a processing module, configured to perform Gaussian blur processing having a predefined blur radius on the gray image, and obtain a reference image; and
an adjusting module, configured to, according to gray values of reference pixels of the reference image, decrease a pixel value of a pixel of the to-be-processed image corresponding to a reference pixel whose gray value is larger than a gray threshold, increase a pixel value of a pixel of the to-be-processed image corresponding to a reference pixel whose gray value is smaller than the gray threshold, and obtain an adjusted image.

In the above image processing method and apparatus, the to-be-processed image is converted into a gray image, and Gaussian blur processing is performed on the gray image to obtain a reference image. The reference image may represent the distribution of bright and dark regions of the to-be-processed image. According to gray values of reference pixels of the reference image, the pixel value of a pixel of the to-be-processed image corresponding to a reference pixel whose gray value is larger than a gray threshold is decreased. That is, the brighter pixel of the to-be-processed image is lighted down. The pixel value of a pixel of the to-be-processed image corresponding to a reference pixel whose gray value is smaller than the gray threshold is increased. That is, the darker pixel of the to-be-processed image is lighted up. In this way, in the adjusted image, the brighter region of the to-be-processed image becomes dark, and the darker region becomes brighter, thereby adjusting the image contrast. Moreover, the distribution of bright and dark regions of the to-be-processed image may be maintained, and details of the to-be-processed image may be represented.

BRIEF DESCRIPTION OF DRAWINGS

Features of the present disclosure are illustrated by way of embodiments and not limited in the following figure(s), in which like numerals indicate like elements, in which.

DETAILED DESCRIPTION

For simplicity and illustrative purposes, the present disclosure is described by referring mainly to an embodiment thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Unless the number of components has been defined in contexts, the number of components may be larger than or equal to one, which is not limited in the embodiments of the present disclosure. The steps in the embodiments of the present disclosure are provided with reference signs, but these reference signs are not used to limit the order of the steps. Except that the order of some steps is explicitly defined and the execution of a certain step must be based on other steps, the order of the steps may be adjusted. The term "and/or" is intended to denote one, any combination or all combinations of related items.

Figure 1:
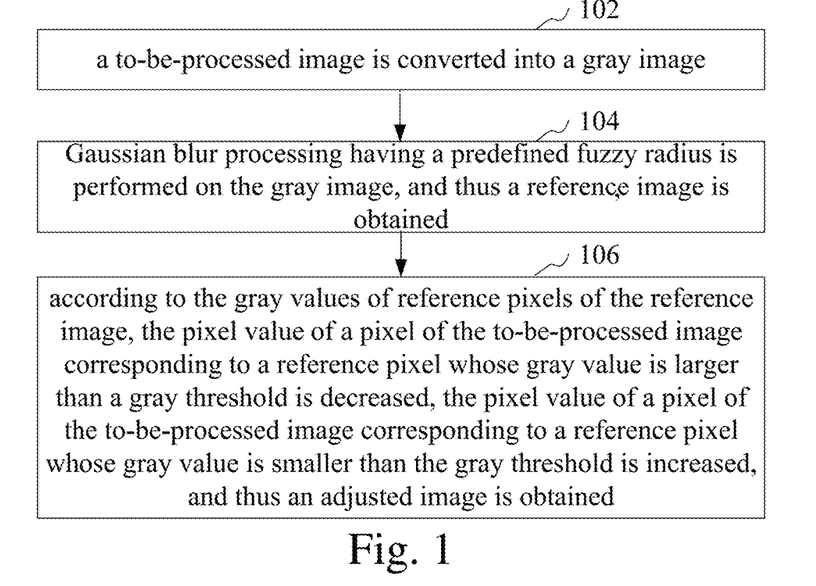
FIG. 1 is a flowchart illustrating an image processing method according to an embodiment of the present disclosure.

FIG. 1 is a flowchart illustrating an image processing method according to an embodiment of the present disclosure. The method includes following blocks.

At block 102, a to-be-processed image is converted into a gray image.

The to-be-processed image refers to an image whose contrast needs to be adjusted. Because quality parameters of an image such as luminance, saturation and contrast are correlated, the adjustment to the contrast of the to-be-processed image may improve other quality parameters of the to-be-processed image.

The process of converting the to-be-processed image into the gray image is implemented as follows. Pixels of the to-be-processed image are traversed. In an implementation, a weighted average or an average of three components (Red (R), Green (G), Blue (B)) of pixel value of each pixel of the to-be-processed image is taken as a gray value of a pixel of the gray image corresponding to the pixel of the to-be-processed image. In another implementation, the largest or smallest one of three components (R, G B) of pixel value of each pixel of the to-be-processed image is taken as a gray value of a pixel of the gray image corresponding to the pixel of the to-be-processed image. In this way, the gray image may be obtained.

At block 104, Gaussian blur processing having a predefined blur radius is performed on the gray image, and thus a reference image is obtained.

The process of performing Gaussian blur processing having the predefined blur radius on the gray image is implemented as follows. Each pixel of the gray image is taken as a center pixel. A weighted average of the gray value of the center pixel and the gray values of pixels that are located in a circle whose center is the center pixel and radius is the predefined blur radius is calculated. The weight of gray value of each pixel participating in the calculation of the weighted average subjects to a two-dimensional normal distribution. The closer a pixel is from the center pixel, the larger the weight of the pixel is. The center pixel has the largest weight. For each center pixel, the obtained weighted average is taken as the pixel value of a pixel of the reference image corresponding to the center pixel, thereby obtaining the reference image.

After Gaussian blur processing is performed on the gray image, the influence of details of the gray image on the distribution of bright and dark regions may be eliminated in the obtained reference image. Accordingly, the reference image may represent the distribution of bright and dark regions of the to-be-processed image. Moreover, the brightness-to-darkness transition in the reference image is smooth, thereby avoiding brightness mutation. In a subsequent process of adjusting the pixel value of a pixel of the to-be-processed image according to the reference image, the distribution of bright and dark regions of the to-be-processed image can be considered, and the mutation of pixel value will not cause color mutation. In this case, image distortion may be avoided.

In this embodiment, the predefined blur radius is positively correlated to the number of row pixels and/or the number of column pixels of the to-be-processed image. The predefined blur radius increases along with the increase of the number of row pixels and/or the number of column pixels of the to-be-processed image, and decreases along with the decrease of the number of row pixels and/or the number of column pixels of the to-be-processed image. The size of predefined blur radius influences the Gaussian blur effect of the reference image. The smaller the predefined blur radius is, the clear the reference image is, the more the remained details are, the more complex the brightness-to-darkness change is. On contrast, the larger the predefined blur radius is, the fuzzier the reference image is, the more the removed details are, the smoother the brightness-to-darkness transition is. In this embodiment, because the predefined blur radius is positively correlated to the number of row pixels and/or the number of column pixels of the to-be-processed image, no matter how the size of the to-be-processed image changes, the reference image having a similar blur effect may be obtained. In this way, an anticipated effect may be obtained when the contrast of the to-be-processed image is adjusted according to the reference image.

In an embodiment, the predefined blur radius may be 0.01~0.3 times the smaller of the number of row pixels and the number of column pixels, for example, 0.03~0.2 times. When the predefined blur radius is 0.01~0.3 times the smaller of the number of row pixels and the number of column pixels, the reference image may represent an ideal distribution of bright and dark regions. When the predefined blur radius is 0.03~0.2 times the smaller of the number of row pixels and the number of column pixels, the smooth degree of brightness-to-darkness transition of the reference image is proper. Accordingly, in this case, the proper smooth degree of the brightness-to-darkness transition of the reference image can be ensured. Because the proper smooth degree can be ensured, it may be avoided that excessive smoothness makes the gray values of pixels of the reference image tend to be consistent, and further the influence on the distribution of bright and dark regions of the reference image may be avoided.

At block 106, according to the gray values of reference pixels of the reference image, the pixel value of a pixel of the to-be-processed image corresponding to a reference pixel whose gray value is larger than a gray threshold is decreased, the pixel value of a pixel of the to-be-processed image corresponding to a reference pixel whose gray value is smaller than the gray threshold is increased, and thus an adjusted image is obtained.

The reference pixel refers to a pixel of the reference image. In this embodiment, the pixel value of a pixel of the to-be-processed image corresponding to a reference pixel of the reference image is adjusted according to the gray value of the reference pixel, thereby adjusting the contrast of the to-be-processed image.

In an implementation, reference pixels of the reference image are traversed. It is determined whether the gray value of the current reference pixel is larger than or equal to the gray threshold. If the gray value of the current reference pixel is larger than or equal to the gray threshold, the gray value of the current reference pixel and the pixel value of a pixel of the to-be-processed image corresponding to the current reference pixel are fed into a first function to obtain a function value. If the gray value of the current reference pixel is not larger than or equal to the gray threshold, the gray value of the current reference pixel and the pixel value of the pixel of the to-be-processed image corresponding to the current reference pixel are fed into a second function to obtain a function value. The obtained function value is taken as the pixel value of a pixel of the adjusted image corresponding to the current reference pixel, and thus the adjusted image is obtained. In this way, the increase or decrease degree of the pixel value of each pixel of the to-be-processed image is correlated to the gray value of the reference pixel of the reference image corresponding to the pixel of the to-be-processed image. And, the increase or decrease degree of the pixel value of each pixel of the to-be-processed image may be determined through adjusting the first function and the second function according to actual requirements. The first function and/or the second function may be a nonlinearity function such as an exponential function, a logarithm function or a power function, or may be a linearity function.

When the gray value of the current reference pixel is unequal to the gray threshold, the function value obtained through the first function is smaller than the pixel value of pixel of the to-be-processed image corresponding to the current reference pixel. And thus, the pixel value of the pixel of the to-be-processed image corresponding to the reference pixel whose gray value is larger than the gray threshold is decreased. When the gray value of the current reference pixel is unequal to the gray threshold, the function value obtained through the second function is larger than the pixel value of the pixel of the to-be-processed image corresponding to the current reference pixel. And thus, the pixel value of the pixel of the to-be-processed image corresponding to the reference pixel whose gray value is larger than the gray threshold is increased.

When the gray value of the current reference pixel is equal to the gray threshold, the function value obtained through the first function is equal to the function value obtained through the second function, and the both function values are equal to the pixel value of the pixel of the to-be-processed image corresponding to the current reference pixel. In this way, the curve of the first function and the curve of the second function are continuous at the gray threshold, thereby avoiding pixel jump of the adjusted image at the gray threshold and further avoiding color jump of the adjusted image. When the curve of the first function and the curve of the second function form an s-curve, the contrast of the adjusted image is good.

In an embodiment, before block 106 is performed, normalization processing is performed on the gray value of the reference pixel and the pixel value of the pixel of the to-be-processed image corresponding to the reference pixel. After the adjusted image is generated at block 106, the functions corresponding to the above formed s-curve are applied to all pixels of the adjusted image to obtain an intermediate image. And then, reverse normalization processing is performed on all pixels of the intermediate to obtain a normal image. In this way, the influence of variant gray scales may be eliminated, computation complexity may be decreased, and thus the efficiency of adjusting the image contrast may be improved.

In the above image processing method, the to-be-processed image is converted into a gray image, and Gaussian blur processing is performed on the gray image to obtain a reference image. The reference image may represent the distribution of bright and dark regions of the to-be-processed image. According to gray values of reference pixels of the reference image, the pixel value of a pixel of the to-be-processed image corresponding to a reference pixel whose gray value is larger than a gray threshold is decreased. That is, the brighter pixel of the to-be-processed image is lighted down. The pixel value of a pixel of the to-be-processed image corresponding to a reference pixel whose gray value is smaller than the gray threshold is increased. That is, the darker pixel of the to-be-processed image is lighted up. In this way, in the adjusted image, the brighter region of the to-be-processed image becomes dark, and the darker region becomes brighter, thereby adjusting the image contrast. Moreover, the distribution of bright and dark regions of the to-be-processed image may be maintained, and details of the to-be-processed image may be represented.

In an embodiment, block 102 includes performing histogram stretch on the to-be-processed image to obtain an intermediate image, and converting the intermediate image into the gray image.

When performing histogram stretch on the to-be-processed image, pixels in each level of the to-be-processed image may be accounted. Then, according to a predefined algorithm, linearity extension or non-linearity extension is performed on pixels distributed centrally in the to-be-processed image, so that the pixels of the to-be-processed image may be distributed in a larger range. In this embodiment, histogram stretch is performed on the to-be-processed image to obtain an intermediate image. And thus, the contrast of the intermediate image is improved, and the contrast between the brightness and the darkness is improved. In this way, the distribution of bright and dark regions of the reference image is represented clearly, and the contrast of the adjusted image becomes more obvious. When the contrast of the to-be-processed image is worse, for example an image shot at night, the contrast of the intermediate image obtained through performing histogram stretch is better than the contrast of the to-be-processed image.

Figure 2:
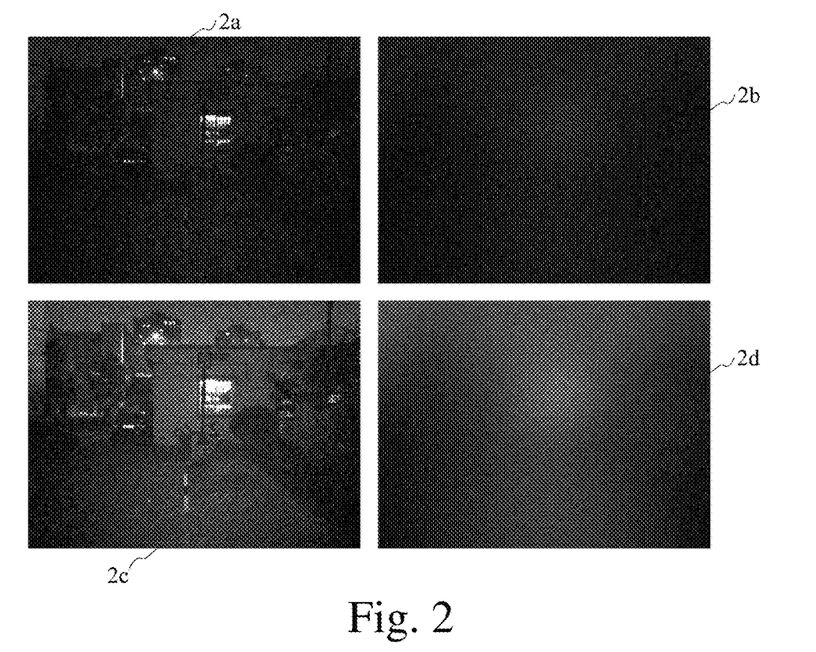
FIG. 2 is a diagram illustrating four images during an image processing procedure according to an embodiment of the present disclosure.

FIG. 2 shows four images during an image processing procedure. The four images include a to-be-processed image 2a, a reference image 2b, an image 2c and a reference image 2d. The reference image 2b is obtained through converting the to-be-processed image 2a into a gray image and performing Gaussian blur processing (which takes one-tenth of column pixels as a blur radius) on the gray image. The image 2c is obtained through performing histogram stretch on the to-be-processed image 2a. The reference image 2d is generated through converting the image 2c into a gray image and performing Gaussian blur processing (which takes one-tenth of column pixels as the blur radius) on the gray image. Obviously, because the contrast of the to-be-processed image 2a is small, the gray values of pixels of the reference image 2b tend to be consistent. In this case, the reference image 2b cannot represent the distribution of bright and dark regions of the to-be-processed image 2a. However, because the reference image 2d is obtained based on the image 2c that is obtained through performing histogram stretch on the to-be-processed image 2a, the reference image 2d may represent the distribution of bright and dark regions of the to-be-processed image 2a.

In an embodiment, block 106 includes searching a predefined mapping table for a mapping value according to the gray value of a reference pixel of the reference image and the pixel value of a pixel of the to-be-processed image corresponding to the reference pixel, and generating the adjusted image according to the searched-out mapping value. If the gray value of the reference pixel is larger than the gray threshold, the mapping value is smaller than the pixel value of the pixel of the to-be-processed image corresponding to the reference pixel. If the gray value of the reference pixel is smaller than the gray threshold, the mapping value is larger than the pixel value of the pixel of the to-be-processed image corresponding to the reference pixel.

In this embodiment, the predefined mapping table includes a mapping relationship among the gray value of the reference pixel, the pixel value of the pixel of the to-be-processed image and the pixel value of the pixel of the adjusted image. When the contrast of the to-be-processed image is adjusted, according to the gray value of the reference pixel and the pixel value of the pixel of the to-be-processed image corresponding to the reference pixel, the mapping table is searched to search out a mapping value. And then, the mapping value is taken as the pixel value of a pixel of the adjusted image corresponding to the reference pixel, thereby obtaining the adjusted image.

The mapping value in the mapping table has features (1) and (2). Feature (1) is described as follows. If the gray value of the reference pixel is larger than the gray threshold, the mapping value is smaller than the pixel value of the pixel of the to-be-processed image corresponding to the reference pixel. Feature (2) is described as follows. If the gray value of the reference pixel is smaller than the gray threshold, the mapping value is larger than the pixel value of the pixel of the to-be-processed image corresponding to the reference pixel. In this way, the pixel value of a pixel of the to-be-processed image corresponding to a reference pixel whose gray value is larger than the gray threshold is decreased. The pixel value of a pixel of the to-be-processed image corresponding to a reference pixel whose gray value is smaller than the gray threshold is increased.

In this embodiment, through obtaining the mapping value from the mapping table to generate the adjusted image, an operation speed may be improved greatly, thereby meeting the requirements on the rapid adjustment of image contrast.

In an embodiment, the image processing method further includes generating the mapping table. The process of generating the mapping table is implemented as follows.

A range of the gray value and the pixel value is traversed, and a mapping value is calculated according to the gray value, the pixel value and the gray threshold. A mapping value that is obtained according to the gray value larger than the gray threshold is smaller than the pixel value, and a mapping value that is obtained according to the gray value smaller than the gray threshold is larger than the pixel value.

The range of the gray value and the pixel value is [0, 255]. The gray value and the pixel value may be given with each one of [0, 255], and a mapping value corresponding to each gray value and pixel value is calculated. Further, when the mapping value corresponding to each gray value and pixel value is calculated, it is determined whether the current gray value is larger than or equal to the gray threshold. If the current gray value is larger than or equal to the gray threshold, the current gray value and the current pixel value are fed into a first function to obtain a mapping value. If the current gray value is not larger than or equal to the gray threshold, the current gray value and the current pixel value are fed into a second function to obtain a mapping value. The first function and/or the second function may be a nonlinearity function such as an exponential function, a logarithm function or a power function, or may be a linearity function.

When the current gray value is unequal to the gray threshold, the mapping value obtained through the first function is smaller than the current pixel value, and the mapping value obtained through the second function is larger than the current pixel value. When the current gray value is equal to the gray threshold, the mapping value obtained through the first function is equal to the mapping value obtained through the second function, and is equal to the current pixel value. In this way, the curve of the first function and the curve of the second function are continuous at the gray threshold, thereby avoiding color jump caused by pixel jump. When the curve of the first function and the curve of the second function form an s-curve, the contrast of the adjusted image is good.

A mapping table is created according to the gray value, the pixel value and the obtained mapping value.

According to the gray value, the pixel value and the obtained mapping value, a 256*256 two-dimensional mapping table may be created. The pixel value is composed of three components (R, G, B). The value ranges of the three components are also [0, 255] respectively. Based on one of the three components and a gray value, a mapping value may be calculated. If one of the three components has the same value with another one of the three components and the gray values are the same, the obtained two mapping values are also the same. No matter which component, if the values of components are the same, the mapping values corresponding to the same gray values are the same. Accordingly, only one 256*256 two-dimensional mapping table needs to be created, without needing to create three 256*256 two-dimensional mapping tables. Further, the performance of the 256*256 two-dimensional mapping table is better than that of the three 256*256 two-dimensional mapping table.

In this embodiment, by the created mapping table, the mapping value may be searched out rapidly, thereby improving the efficiency of adjusting the image contrast.

In an embodiment, an adjustment degree of the pixel value of a pixel of the to-be-processed image is correlated to a predefined adjustment degree parameter; and/or the mapping value in the mapping table is generated according to the predefined adjustment degree parameter.

In this embodiment, the adjustment degree of the value of the pixel of the to-be-processed image is not only correlated to the gray value of the reference pixel corresponding to the pixel of the to-be-processed image, but also is correlated to the predefined adjustment degree parameter. The predefined adjustment degree parameter is introduced into the process of generating the mapping value in the mapping table. An argument such as the predefined adjustment degree parameter may be introduced into the first function and the second function. The decrease or increase degree of the value of the pixel of the to-be-processed image may be adjusted through adjusting the size of the predefined adjustment degree parameter, thereby controlling the adjustment effect of the image contrast.

In this embodiment, a user may control the decrease or increase degree of the value of the pixel of the to-be-processed image through predefining the size of the adjustment degree parameter, thereby controlling the adjustment degree of the image contrast according to actual requirements, and further improving the compatibility of the image processing method.

The image processing method will be illustrated with reference to a scenario hereinafter.

Figure 3:
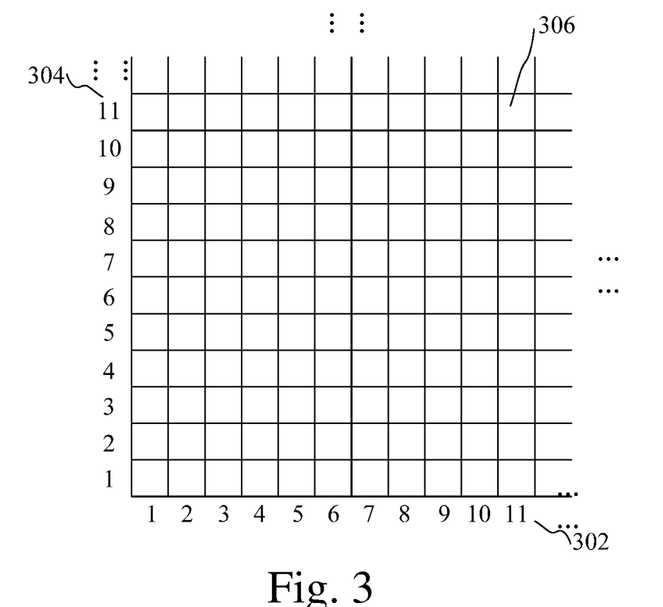
FIG. 3 is a diagram illustrating a part of a mapping table created in a scenario according to an embodiment of the present disclosure.

The gray value and the pixel value are given with each one of [0, 255]. The gray value and the pixel value larger than or equal to the gray threshold are fed into the first function to obtain a mapping value. The gray value and the pixel value smaller than the gray threshold are fed into the second function to obtain a mapping value. Then, a two-dimensional mapping table is created, as shown in FIG. 3. One dimensionality 302 of the mapping table represents the gray value, and the other dimensionality 304 of the mapping table represents the pixel value. The obtained mapping value is filled into a location 306 corresponding to the gray value and the pixel value, and finally a 256*256 two-dimensional mapping table is obtained.

Figure 4:
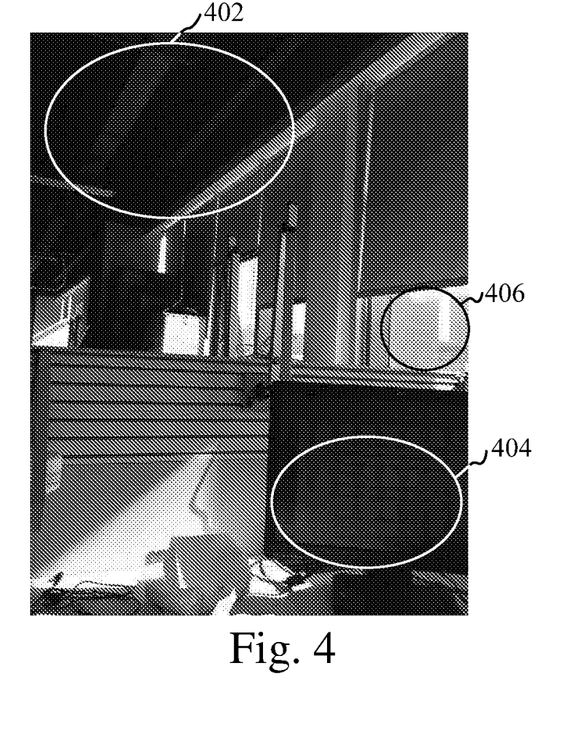
FIG. 4 is a diagram illustrating a to-be-processed image in a scenario according to an embodiment of the present disclosure.

FIG. 4 is a diagram illustrating a to-be-processed image. As can be seen from FIG. 4, a dark part of the to-be-processed image is too dark, for example, parts 402 and 404 shown in FIG. 4, but a bright part of the to-be-processed image is too bright, for example, a part 406 shown in FIG. 4. Accordingly, the details of the to-be-processed image are difficult to be represented clearly, for example, a pipeline in the part 404 shown in FIG. 4. Thus, it is needed to adjust the contrast of the to-be-processed image shown in FIG. 4.

Figure 5:
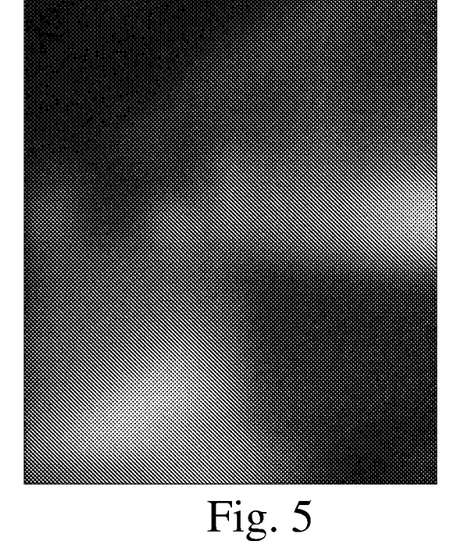
FIG. 5 is a diagram illustrating a reference image that is obtained after the to-be-processed image shown in FIG. 4 is processed according to an embodiment of the present disclosure.

The to-be-processed image shown in FIG. 4 is converted into a gray image through performing histogram stretch on the to-be-processed image, and then Gaussian blur processing is performed on the gray image to obtain a reference image shown in FIG. 5. The Gaussian blur processing takes one-tenth of row pixels as the blur radius because the number of row pixels is smaller than the number of column pixels. As can be seen, the details of the to-be-processed image shown in FIG. 4 are removed from the reference image shown in FIG. 5, but the distribution of bright and dark regions of the to-be-processed image is reserved. Accordingly, the brightness-to-darkness transition in the reference image is smooth, thereby avoiding brightness mutation.

Figure 6:
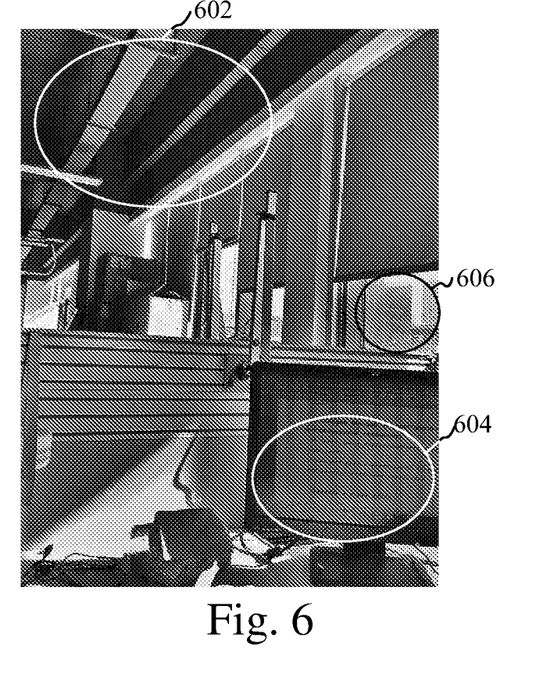
FIG. 6 is a diagram illustrating an adjusted image obtained according to the to-be-processed image shown in FIG. 4 and the reference image shown in FIG. 5.

According to the gray value of each reference pixel of the reference image shown in FIG. 5 and the pixel value of the pixel of the to-be-processed image shown in FIG. 4 corresponding to the reference pixel, the mapping table is searched to obtain a mapping value, and the adjusted image shown in FIG. 6 is generated according to the obtained mapping value. As can be seen, compared with the dark parts (for example, the parts 402 and 404 shown in FIG. 4) of the to-be-processed image and the bright part (for example, the part 406 shown in FIG. 4) of the to-be-processed image, dark parts (for example, parts 602 and 604 shown in FIG. 6) of the adjusted image shown in FIG. 6 become bright, and a bright part (for example, a part 606 shown in FIG. 6) of the adjusted image shown in FIG. 6 becomes dark. The difference between the brightness and the darkness is decreased, and the image contrast is decreased. Moreover, the distribution of bright and dark regions of the to-be-processed image is reserved. Accordingly, the brightness-to-darkness transition in the adjusted image is smooth, thereby improving the image effect.

Figure 7:
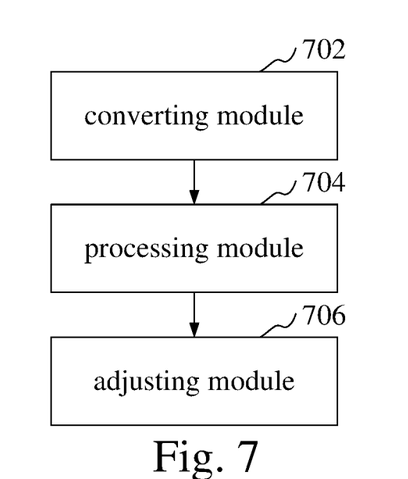
FIG. 7 is a diagram illustrating the structure of an image processing apparatus according to an embodiment of the present disclosure.

FIG. 7 is a diagram illustrating the structure of an image processing apparatus according to an embodiment of the present disclosure. The apparatus includes a converting module 702, a processing module 704 and an adjusting module 706.

The converting module 702 may convert a to-be-processed image into a gray image.

The converting module 702 may traverse pixels of the to-be-processed image, and take a weighted average or an average of three components (R, G, B) of pixel value of each pixel of the to-be-processed image as a gray value of a pixel of the gray image corresponding to the pixel of the to-be-processed image, or take the largest or smallest one of three components (R, G B) of pixel value of each pixel of the to-be-processed image as a gray value of a pixel of the gray image corresponding to the pixel of the to-be-processed image. In this way, the gray image may be obtained.

The processing module 704 may perform Gaussian blur processing having a predefined blur radius on the gray image, and thus obtain a reference image.

The processing module 704 may take each pixel of the gray image as a center pixel, calculate a weighted average of the gray value of the center pixel and the gray values of pixels that are located in a circle whose center is the center pixel and radius is the predefined blur radius. The weight of gray value of each pixel participating in the calculation of the weighted average subjects to a two-dimensional normal distribution. The closer a pixel is from the center pixel, the larger the weight of the pixel is. The center pixel has the largest weight. For each center pixel, the obtained weighted average is taken as the pixel value of a pixel of the reference image corresponding to the center pixel, thereby obtaining the reference image.

After the processing module 704 performs Gaussian blur processing on the gray image, the influence of details of the gray image on the distribution of bright and dark regions may be eliminated in the obtained reference image. Accordingly, the reference image may represent the distribution of bright and dark regions of the to-be-processed image. Moreover, the brightness-to-darkness transition in the reference image is smooth, thereby avoiding brightness mutation. In a subsequent process of adjusting the pixel value of a pixel of the to-be-processed image according to the reference image, not only the distribution of bright and dark regions of the to-be-processed image is considered, but also it may be avoided that the mutation of pixel value causes color mutation, thereby avoiding image distortion.

According to a gray values of reference pixels of the reference image, the adjusting module 706 may decrease the pixel value of a pixel of the to-be-processed image corresponding to a reference pixel whose gray value is larger than a gray threshold, increase the pixel value of a pixel of the to-be-processed image corresponding to a reference pixel whose gray value is smaller than the gray threshold, and thus obtain an adjusted image.

The reference pixel refers to a pixel of the reference image. The adjusting module 706 may adjust the pixel value of a pixel of the to-be-processed image corresponding to a reference pixel of the reference image according to the gray value of the reference pixel, thereby adjusting the contrast of the to-be-processed image.

In an implementation, the adjusting module 706 may traverse reference pixels of the reference image, and determines whether the gray value of the current reference pixel is larger than or equal to the gray threshold. If the gray value of the current reference pixel is larger than or equal to the gray threshold, the adjusting module 706 feeds the gray value of the current reference pixel and the pixel value of a pixel of the to-be-processed image corresponding to the current reference pixel into a first function to obtain a function value. If the gray value of the current reference pixel is not larger than or equal to the gray threshold, the adjusting module 706 feeds the gray value of the current reference pixel and the pixel value of the pixel of the to-be-processed image corresponding to the current reference pixel into a second function to obtain a function value. The adjusting module 706 takes the obtained function value as the pixel value of a pixel of the adjusted image corresponding to the current reference pixel, and thus obtains the adjusted image. In this way, the increase or decrease degree of the pixel value of each pixel of the to-be-processed image is correlated to the gray value of the reference pixel of the reference image corresponding to the pixel of the to-be-processed image. And, the increase or decrease degree of the pixel value of each pixel of the to-be-processed image may be determined through adjusting the first function and the second function according to actual requirements. The first function and/or the second function may be a nonlinearity function such as an exponential function, a logarithm function or a power function, or may be a linearity function.

When the gray value of the current reference pixel is unequal to the gray threshold, the function value obtained through the first function is smaller than the pixel value of pixel of the to-be-processed image corresponding to the current reference pixel, and thus the pixel value of the pixel of the to-be-processed image corresponding to the reference pixel whose gray value is larger than the gray threshold is decreased. The function value obtained through the second function is larger than the pixel value of the pixel of the to-be-processed image corresponding to the current reference pixel, and thus the pixel value of the pixel of the to-be-processed image corresponding to the reference pixel whose gray value is larger than the gray threshold is increased.

When the gray value of the current reference pixel is equal to the gray threshold, the function value obtained through the first function is equal to the function value obtained through the second function, and the both function values are equal to the pixel value of the pixel of the to-be-processed image corresponding to the current reference pixel. In this way, the curve of the first function and the curve of the second function are continuous at the gray threshold, thereby avoiding pixel jump of the adjusted image at the gray threshold and further avoiding color jump of the adjusted image. When the curve of the first function and the curve of the second function form an s-curve, the contrast of the adjusted image is good.

In the above image processing apparatus, the to-be-processed image is converted into a gray image, and Gaussian blur processing is performed on the gray image to obtain a reference image. The reference image may represent the distribution of bright and dark regions of the to-be-processed image. According to gray values of reference pixels of the reference image, the pixel value of a pixel of the to-be-processed image corresponding to a reference pixel whose gray value is larger than a gray threshold is decreased. That is, the brighter pixel of the to-be-processed image is lighted down. The pixel value of a pixel of the to-be-processed image corresponding to a reference pixel whose gray value is smaller than the gray threshold is increased. That is, the darker pixel of the to-be-processed image is lighted up. In this way, in the adjusted image, the brighter region of the to-be-processed image becomes dark, and the darker region becomes brighter, thereby adjusting the image contrast. Moreover, the distribution of bright and dark regions of the to-be-processed image may be maintained, and details of the to-be-processed image may be represented.

In an embodiment, the adjusting module 706 may perform normalization processing on the gray value of the reference pixel and the pixel value of the pixel of the to-be-processed image corresponding to the reference pixel before adjusting the pixel of the to-be-processed image. After the adjusted image is generated, the adjusting module 706 may apply the functions corresponding to the above formed s-curve to all pixels of the adjusted image to obtain an intermediate image, and perform reverse normalization processing on all pixels of the intermediate, and thus obtain a normal image. In this way, the influence of variant gray scales may be eliminated, computation complexity may be decreased, and thus the efficiency of adjusting the image contrast may be improved.

In an embodiment, the converting module 702 may perform histogram stretch on the to-be-processed image to obtain an intermediate image, and convert the intermediate image into the gray image.

In an implementation, the converting module 702 may account pixels in each level of the to-be-processed image. Then, according to a predefined algorithm, the converting module 702 performs linearity extension or non-linearity extension on pixels distributed centrally in the to-be-processed image, so that the pixels of the to-be-processed image may be distributed in a larger range. In this embodiment, histogram stretch is performed on the to-be-processed image to obtain an intermediate image, thus the contrast of the intermediate image is improved and the contrast between the brightness and the darkness is improved. In this way, the distribution of bright and dark regions of the reference image is represented clearly, and the contrast of the adjusted image becomes more obvious. When the contrast of the to-be-processed image is worse, for example an image shot at night, the contrast of the intermediate image obtained through performing histogram stretch is better than the contrast of the to-be-processed image.

In this embodiment, the predefined blur radius is positively correlated to the number of row pixels and/or the number of column pixels of the to-be-processed image. The predefined blur radius increases along with the increase of the number of row pixels and/or the number of column pixels of the to-be-processed image, and decreases along with the decrease of the number of row pixels and/or the number of column pixels of the to-be-processed image. The size of predefined blur radius influences the Gaussian blur effect of the reference image. The smaller the predefined blur radius is, the clear the reference image is, the more the remained details are, the more complex the brightness-to-darkness change is. On contrast, the larger the predefined blur radius is, the fuzzier the reference image is, the more the removed details are, the smoother the brightness-to-darkness transition is. In this embodiment, because the predefined blur radius is positively correlated to the number of row pixels and/or the number of column pixels of the to-be-processed image, no matter how the size of the to-be-processed image changes, the reference image having a similar blur effect may be obtained. In this way, an anticipated effect may be obtained when the contrast of the to-be-processed image is adjusted according to the reference image.

In an embodiment, the predefined blur radius may be 0.01~0.3 times the smaller of the number of row pixels and the number of column pixels, for example, 0.03~0.2 times. When the predefined blur radius is 0.01~0.3 times the smaller of the number of row pixels and the number of column pixels, the reference image may represent an ideal distribution of bright and dark regions. When the predefined blur radius is 0.03~0.2 times the smaller of the number of row pixels and the number of column pixels, the smooth degree of brightness-to-darkness transition of the reference image is proper. Accordingly, in this case, the proper smooth degree of the brightness-to-darkness transition of the reference image can be ensured. Because the proper smooth degree can be ensured, it may be avoided that excessive smoothness makes the gray values of pixels of the reference image tend to be consistent, and further the influence on the distribution of bright and dark regions of the reference image may be avoided.

In an embodiment, the adjusting module 706 may search a predefined mapping table for a mapping value according to the gray value of a reference pixel of the reference image and the pixel value of a pixel of the to-be-processed image corresponding to the reference pixel, and generate the adjusted image according to the searched-out mapping value. If the gray value of the reference pixel is larger than the gray threshold, the mapping value is smaller than the pixel value of the pixel of the to-be-processed image corresponding to the reference pixel. If the gray value of the reference pixel is smaller than the gray threshold, the mapping value is larger than the pixel value of the pixel of the to-be-processed image corresponding to the reference pixel.

In this embodiment, the predefined mapping table includes a mapping relationship among the gray value of the reference pixel, the pixel value of the pixel of the to-be-processed image and the pixel value of the pixel of the adjusted image. According to the gray value of the reference pixel and the pixel value of the pixel of the to-be-processed image corresponding to the reference pixel, the adjusting module 706 may search the mapping table for a mapping value, take the mapping value as the pixel value of a pixel of the adjusted image corresponding to the reference pixel, and thus obtain the adjusted image.

The mapping value in the mapping table has features (1) and (2). Feature (1) is described as follows. If the gray value of the reference pixel is larger than the gray threshold, the mapping value is smaller than the pixel value of the pixel of the to-be-processed image corresponding to the reference pixel. Feature (2) is described as follows. If the gray value of the reference pixel is smaller than the gray threshold, the mapping value is larger than the pixel value of the pixel of the to-be-processed image corresponding to the reference pixel. In this way, the pixel value of a pixel of the to-be-processed image corresponding to a reference pixel whose gray value is larger than the gray threshold is decreased. The pixel value of a pixel of the to-be-processed image corresponding to a reference pixel whose gray value is smaller than the gray threshold is increased.

In this embodiment, through obtaining the mapping value from the mapping table to generate the adjusted image, an operation speed may be improved greatly, thereby meeting the requirements on the rapid adjustment of image contrast.

Figure 8:
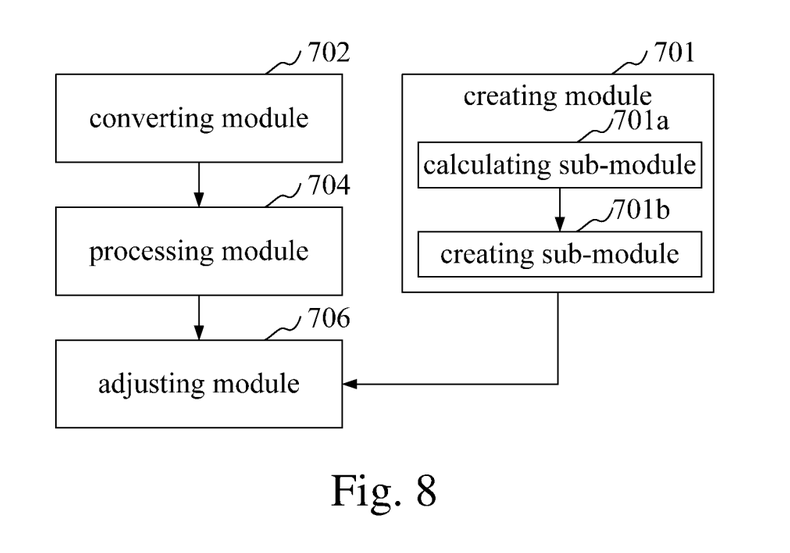
FIG. 8 is a diagram illustrating the structure of an image processing apparatus according to another embodiment of the present disclosure.

In an embodiment, the apparatus further includes a generating module 701, configured to generating the mapping table, as shown in FIG. 8. The generating module 701 includes a calculating sub-module 701a and a generating sub-module 701b.

The calculating sub-module 701a may traverse a range of the gray value and the pixel value, and calculate a mapping value according to the gray value, the pixel value and the gray threshold. A mapping value that is obtained according to the gray value larger than the gray threshold is smaller than the pixel value, and a mapping value that is obtained according to the gray value smaller than the gray threshold is larger than the pixel value.

The range of the gray value and the pixel value is [0, 255]. The calculating sub-module 701a may give the gray value and the pixel value with each one of [0, 255], and calculate a mapping value corresponding to each gray value and pixel value. Further, when the mapping value corresponding to each gray value and pixel value is calculated, the calculating sub-module 701a determines whether the current gray value is larger than or equal to the gray threshold. If the current gray value is larger than or equal to the gray threshold, the calculating sub-module 701a feeds the current gray value and the current pixel value into a first function to obtain a mapping value. If the current gray value is not larger than or equal to the gray threshold, the calculating sub-module 701a feeds the current gray value and the current pixel value into a second function to obtain a mapping value. The first function and/or the second function may be a nonlinearity function such as an exponential function, a logarithm function or a power function, or may be a linearity function.

When the current gray value is unequal to the gray threshold, the mapping value obtained through the first function is smaller than the current pixel value, and the mapping value obtained through the second function is larger than the current pixel value. When the current gray value is equal to the gray threshold, the mapping value obtained through the first function is equal to the mapping value obtained through the second function, and is equal to the current pixel value. In this way, the curve of the first function and the curve of the second function are continuous at the gray threshold, thereby avoiding color jump caused by pixel jump. When the curve of the first function and the curve of the second function form an s-curve, the contrast of the adjusted image is good.

The creating sub-module 701b may create the mapping table according to the gray value, the pixel value and the obtained mapping value.

According to the gray value, the pixel value and the obtained mapping value, the creating sub-module 701b may create a 256*256 two-dimensional mapping table. The pixel value is composed of three components (R, G, B). The value ranges of the three components are also [0, 255] respectively. Based on one of the three components and a gray value, a mapping value may be calculated. If one of the three components has the same value with another one of the three components and the gray values are the same, the obtained two mapping values are also the same. No matter which component, if the values of components are the same, the mapping values corresponding to the same gray values are the same. Accordingly, only one 256*256 two-dimensional mapping table needs to be created, without needing to create three 256*256 two-dimensional mapping tables. Further, the performance of the 256*256 two-dimensional mapping table is better than that of the three 256*256 two-dimensional mapping tables.

In this embodiment, the generating module 701 may create the mapping table. By the created mapping table, the mapping value may be searched out rapidly, thereby improving the efficiency of adjusting the image contrast.

In an embodiment, an adjustment degree of the value of a pixel of the to-be-processed image is correlated to a predefined adjustment degree parameter; and/or the mapping value in the mapping table is generated according to the predefined adjustment degree parameter.

In this embodiment, the adjustment degree of the value of the pixel of the to-be-processed image is not only correlated to the gray value of the reference pixel corresponding to the pixel of the to-be-processed image, but also is correlated to the predefined adjustment degree parameter. The predefined adjustment degree parameter is introduced into the process of generating the mapping value in the mapping table. An argument such as the predefined adjustment degree parameter may be introduced into the first function and the second function, and the decrease or increase degree of the value of the pixel of the to-be-processed image may be adjusted through adjusting the size of the predefined adjustment degree parameter, thereby controlling the adjustment effect of the image contrast.

In this embodiment, a user may control the decrease or increase degree of the value of the pixel of the to-be-processed image through predefining the size of the adjustment degree parameter, thereby controlling the adjustment degree of the image contrast according to actual requirements, and further improving the compatibility of the image processing method.

Figure 9:
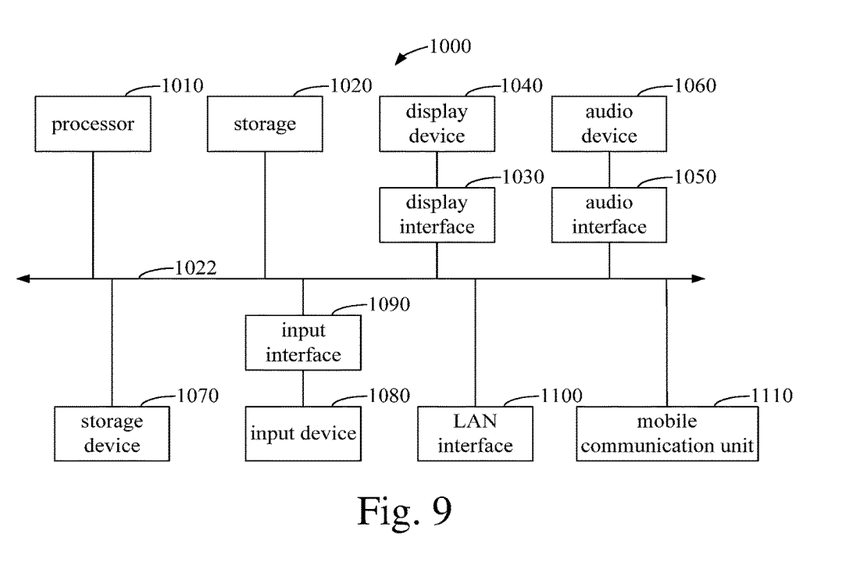
FIG. 9 is a diagram illustrating the module structure of a computer system for implementing an image processing method according to an embodiment of the present disclosure.

FIG. 9 is a diagram illustrating the structure of a computer system 1000 for implementing the image processing method and apparatus provided by the embodiments of the present disclosure. The computer system 1000 is an example applicable to the embodiments of the present disclosure, and is not used to limit the protection scope of the present disclosure.

The computer system 1000 shown in FIG. 9 is an example applicable to the embodiments of the present disclosure, and may have another structure having different sub-system configurations. For example, a desktop, a laptop, a Personal Digital Assistant (PDA), a smart phone, a tablet Personal Computer (PC), a portable media player, a set-top-box and another similar device may be applicable to the embodiments of the present disclosure.

As shown in FIG. 9, the computer system 1000 includes a processor 1010, a storage 1020 and a system bus 1022. Various components including the storage 1020 and the processor 1010 are all connected to the system bus 1022. The processor 1020 is hardware for executing computer program instructions through basic arithmetic and logic operations. The storage 1020 is a physical device for temporally or permanently store computer programs or data (for example, program state information). The system bus 1020 may be any one of following types of buses, and includes a storage bus or a storage controller, a peripheral bus and a local bus. The processor 1010 and the storage 1020 may communicate with each other through the system bus 1022. The storage 1020 includes a read-only memory (ROM) or a flash (not shown in drawings), and a Random Access Memory (RAM). The RAM refers to a primary storage in which an operation system and an application is loaded.

The computer system 1000 also includes a display interface 1030 (for example, a GUI processing unit), a display device 1040 (for example, a Liquid Crystal Display (LCD)), an audio interface 1050 (for example, a sound card) and an audio device 1060 (for example, a speaker). The display device 1040 and the audio device 1060 are media devices for playing media contents.

The computer system 1000 includes a storage device 1070. The storage device 1070 may be one of multiple computer readable mediums. The computer readable mediums refer to any available medium that may be accessed through the computer system 1000, and may include mobile and fixed mediums. For example, the computer readable mediums include, but are not limited to, a flash memory (a minisize Secure Digital (SD) memory card), a CD-ROM, a Digital Video Disc (DVD), a CD storage, a magnetic tape, a disk storage or other magnetic storage devices, or any other medium that may store information and may be accessed by the computer system 1000.

The computer system 1000 also includes an input device 1080 and an input interface 1090 (for example, an IO controller). A user may input instructions and information into the computer system 1000 through the input device 1080 (for example, a keyboard, a mouse and a touch panel device on the display apparatus 1040). The input device 1080 is connected to the system bus 1022 through the input interface 1090 or through other interfaces or bus structures, for example, a Universal Serial Bus (USB).

The computer system 1000 may be connected to one or more network devices logically in a network. The network device may be a personal computer, a server, a router, a smart phone, a tablet computer or another public network node. The computer system 1000 is connected to the network device through a Local Area Network (LAN) interface 1100 or a mobile communication unit 1110. The LAN refers to a computer network in a finite region such as a house, a school, a computer laboratory or an office building using network mediums. WiFi and twisted-pair Ethernet are commonly used technologies for creating the LAN. WiFi is a technology allowing the computer system 1000 to exchange data or to be connected to a radio network through radio wave. The mobile communication unit 1110 may answer or dial a phone through a radio communication line in a large geographical region. In addition, the mobile communication unit 1110 supports Internet access in 2G, 3G and 4G communication systems providing mobile data services.

The computer system 1000 may include more or less components in another embodiment. For example, the computer system 1000 may include a Bluetooth for exchanging data in a short range, an image sensor for shot and an accelerometer for measuring acceleration.

The computer system 1000 may execute the operations of the image processing method. The computer system 1000 may execute the operations in the form of executing software instructions in the computer readable medium by the processor 1010. The software instructions may be written into the storage 1020 from the storage device 1070 or from another device through the LAN interface 1100. The software instructions stored in the storage 1020 make the processor 1010 execute the above image processing method. In addition, the image processing method may be implemented through a hardware circuit or through the combination of the hardware circuit and the software instructions. Accordingly, the present disclosure is not limited to any combination of the hardware circuit and the software instructions.

Although described specifically throughout the entirety of the instant disclosure, representative embodiments of the present disclosure have utility over a wide range of applications, and the above discussion is not intended and should not be construed to be limiting, but is offered as an illustrative discussion of aspects of the disclosure.

What has been described and illustrated herein is an embodiment along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

The foregoing is only several embodiments of the present disclosure, and the protection scope of the present disclosure is not limited to this. It should be noted that any modification and improvement which can be made by those skilled in the art within the principle of the present disclosure should be covered in the protection scope of the present disclosure.

And thus, the protection scope of the present disclosure should be defined by the claims.

What is claimed is:

1. An image processing method, comprising:
   converting a to-be-processed image into a gray image;
   performing Gaussian blur processing having a predefined blur radius on the gray image, and obtaining a reference image; and
   according to gray values of reference pixels of the reference image, decreasing a pixel value of a pixel of a copy of the to-be-processed image corresponding to a reference pixel whose gray value is larger than a gray threshold, increasing a pixel value of a pixel of the copy of the to-be-processed image corresponding to a reference pixel whose gray value is smaller than the gray threshold, and obtaining an adjusted image,
   wherein the predefined blur radius is positively correlated to at least one of the number of row pixels of the to-be-processed image and the number of column pixels of the to-be-processed image.

2. An image processing method, comprising:
   converting a to-be-processed image into a gray image;
   performing Gaussian blur processing having a predefined blur radius on the gray image, and obtaining a reference image; and
   according to gray values of reference pixels of the reference image, decreasing a pixel value of a pixel of a copy of the to-be-processed image corresponding to a reference pixel whose gray value is larger than a gray threshold, increasing a pixel value of a pixel of the copy of the to-be-processed image corresponding to a reference pixel whose gray value is smaller than the gray threshold, and obtaining an adjusted image,
   wherein the according to the gray values of the reference pixels of the reference image, decreasing the pixel value of the pixel of the copy of the to-be-processed image corresponding to the reference pixel whose gray value is larger than the gray threshold, increasing the pixel value of the pixel of the copy of the to-be-processed image corresponding to the reference pixel whose gray value is smaller than the gray threshold, and obtaining the adjusted image comprises:
      searching a predefined mapping table for a mapping value according to the gray value of each reference pixel of the reference image and the pixel value of a pixel of the copy of the to-be-processed image corresponding to the reference pixel, and generating the adjusted image according to the searched-out mapping value; and
      if the gray value of a reference pixel is larger than the gray threshold, the mapping value is smaller than the pixel value of a pixel of the copy of the to-be-processed image corresponding to the reference pixel; and if the gray value of a reference pixel is smaller than the gray threshold, the mapping value is larger than the pixel value of a pixel of the copy of the to-be-processed image corresponding to the reference pixel.

3. The method of claim 2, further comprising: generating the mapping table, wherein the generating the mapping table comprises:
   traversing a range of the gray values and the pixel values, calculating a mapping value according to a gray value, a pixel value and the gray threshold; wherein a mapping value that is obtained according to the gray value larger than the gray threshold is smaller than the pixel value, and a mapping value that is obtained according to the gray value smaller than the gray threshold is larger than the pixel value; and
   creating the mapping table according to the gray value, the pixel value and the mapping value.

4. The method of claim 2, wherein an adjustment degree of pixel value of a pixel of the copy of the to-be-processed image is correlated to a predefined adjustment degree parameter; and
   the mapping value in the mapping table is generated according to the predefined adjustment degree parameter.

5. An image processing apparatus, comprising:
   a processor and a non-transitory storage, wherein the non-transitory storage stores one or more instructions that when executed by the processor, cause the processor to:
      convert a to-be-processed image into a gray image;
      perform Gaussian blur processing having a predefined blur radius on the gray image, and obtain a reference image; and
      according to gray values of reference pixels of the reference image, decrease a pixel value of a pixel of a copy of the to-be-processed image corresponding to a reference pixel whose gray value is larger than a gray threshold, increase a pixel value of a pixel of the copy of the to-be-processed image corresponding to a reference pixel whose gray value is smaller than the gray threshold, and obtain an adjusted image;
   wherein the predefined blur radius is positively correlated to at least one of the number of row pixels of the to-be-processed image and the number of column pixels of the to-be-processed image.

6. An image processing apparatus, comprising:
   a processor and a non-transitory storage, wherein the non-transitory storage stores one or more instructions that when executed by the processor, cause the processor to:
      convert a to-be-processed image into a gray image;
      perform Gaussian blur processing having a predefined blur radius on the gray image, and obtain a reference image; and
      according to gray values of reference pixels of the reference image, decrease a pixel value of a pixel of a copy of the to-be-processed image corresponding to a reference pixel whose gray value is larger than a gray threshold, increase a pixel value of a pixel of the copy of the to-be-processed image corresponding to a reference pixel whose gray value is smaller than the gray threshold, and obtain an adjusted image;
   wherein the instructions further cause the processor to search a predefined mapping table for a mapping value according to the gray value of each reference pixel of the reference image and the pixel value of a pixel of the copy of the to-be-processed image corresponding to the reference pixel, and generate the adjusted image according to the searched-out mapping value; if the gray value of a reference pixel is larger than the gray threshold, the mapping value is smaller than the pixel value of a pixel of the copy of the to-be-processed image corresponding to the reference pixel; and if the gray value of a reference pixel is smaller than the gray threshold, the mapping value is larger than the pixel value of a pixel of the copy of the to-be-processed image corresponding to the reference pixel.

7. The apparatus of claim 6, wherein the instructions further cause the processor to:

traverse a range of the gray values and the pixel values, calculate a mapping value according to a gray value, a pixel value and the gray threshold; wherein a mapping value that is obtained according to the gray value larger than the gray threshold is smaller than the pixel value, and a mapping value that is obtained according to the gray value smaller than the gray threshold is larger than the pixel value; and create the mapping table according to the gray value, the pixel value and the mapping value.

8. The apparatus of claim 6, wherein an adjustment degree of the pixel value of a pixel of the copy of the to-be-processed image is correlated to a predefined adjustment degree parameter; and the mapping value in the mapping table is generated according to the predefined adjustment degree parameter.

\* \* \* \* \*

UNITED STATES PATENT AND TRADEMARK OFFICE
CERTIFICATE OF CORRECTION

PATENT NO. : 9,727,960 B2
APPLICATION NO. : 15/103621
DATED : August 8, 2017
INVENTOR(S) : Deqiang Jiang It is certified that error appears in the above-identified patent and that said Letters Patent is hereby corrected as shown below:

In Column 3 at Line 48, Change "(R, G B)" to --(R, G, B)--.

In Column 10 at Line 9, Change "(R, G B)" to --(R, G, B)--.

In Column 14 at Line 38, Change "[0, 255]respectively." to --[0, 255] respectively.--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*